United States Patent Office 3,123,639
Patented Mar. 3, 1964

3,123,639
PRODUCTION OF BETA-HYDROXYALKYL
ETHERS OF OXIMES
Gustave B. Bachman, Lafayette, Ind., and Takeo Hokama,
Pittsburgh, Pa., assignors to Purdue Research Foundation, Lafayette, Ind., a corporation of Indiana
No Drawing. Filed Apr. 16, 1959, Ser. No. 806,748
13 Claims. (Cl. 260—566)

Our invention relates to a method for the production of beta-hydroxyalkyl ethers of oximes and more particularly, to a method of producing beta-hydroxyalkyl ethers of oximes by contacting an alkali metal salt of a primary or secondary nitroalkane with an olefin oxide.

In co-pending application, Serial No. 804,069, filed April 6, 1959, now U.S. Patent 3,040,097, we have disclosed a new series of beta-hydroxyalkyl ethers of oximes and a method of producing same by contacting under basic conditions an olefin oxide and an oxime. We have now discovered that beta-hydroxyalkyl ethers of oximes having the structural formula:

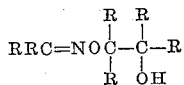

where R is hydrogen, alkyl or aryl, can be produced by contacting an olefin oxide and an alkali metal salt of a primary or secondary nitroalkane. These beta-hydroxyalkyl ethers of oximes include definitions corresponding to the structural formula

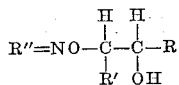

where R is hydrogen, alkyl, or aryl; R' is hydrogen or alkyl; and R'' is alkyl e.g. lower alkyl.

Our process is carried out by contacting at temperatures ranging from 0–100° C. and preferably between 50 and 80° C. an olefin oxide and an alkali metal salt of a primary or secondary nitroalkane. A preferred method of carrying out the reaction consists of producing the alkali metal salt of the primary or secondary nitroalkane in situ by contacting the primary or secondary nitroalkane with a Brönsted (Chem. Rev. 5, 231 (1928)) type alkali metal base having an ionization constant in aqueous solution of not less than $10^{-5}$ and a corresponding strength in non-aqueous media according to Hall's (J.A.C.S., 52, 5115 (1930)) coordinate strength diagram, the base being used in sufficient amount to convert all of the nitro alkane to the corresponding nitronate salt. As used herein, therefore, we regard contacting the olefin oxide with the nitro alkane under basic conditions as the equivalent of the operation consisting of contacting the alkali metal salt of the nitro alkane with the olefin oxide. From an operating point of view, it is simpler to produce the alkali metal salt of the nitro alkane in situ than to produce it separately and then react it with the olefin oxide.

According to our preferred method of operation, we add a primary or secondary nitro alkane to a solution of approximately equimolar portions of a base of the character set forth above to convert the nitro alkane to the corresponding nitronate salt. When the base used is, for example, lithium ethoxide or sodium ethoxide, it can conveniently be prepared by adding lithium or sodium metal to cooled ethanol and the primary or secondary nitro alkane is then added to the ethanol solution containing the lithium ethoxide or sodium ethoxide. To the resulting solution the olefin oxide is then added in an amount sufficient to react with the nitronate formed by the action of the base. For optimum results, approximately 2 moles of olefin oxide should be added for each 1 mole of alkali metal salt of primary or secondary nitro alkane. The reaction can be effected at temperatures ranging from 0 to 100° C., but preferably within the range of 50 to 80° C.

In carrying out our reaction, we can use any olefin oxide but preferably ethylene oxide, propylene oxide, butylene oxide, and styrene oxide. We can use any primary or secondary nitro alkane as, for example, nitroethane, 1-nitropropane, 2-nitropropane, 1-nitrobutane, 2-nitrobutane or other higher homologs thereof. Substitution products of these nitro alkanes can also be used so long as they do not contain a group known to react with an olefin oxide.

In carrying out our process, we react an alkali metal salt of one of the above primary or secondary nitro alkanes with an olefin oxide. As previously indicated, the desired alkali metal salt can be produced in situ by adding the desired nitro alkane to a solution of a base of the character above specified, such as sodium hydroxide, potassium hydroxide, lithium hydroxide, lithium ethoxide, sodium ethoxide and the like.

When the alkali metal salt of the nitro alkane is produced in situ our reaction is necessarily carried out in the presence of a solvent. Any material which is a solvent for the base used and for the alkali metal salt of the nitro alkane produced therewith, such as, for example, water, aliphatic alcohols, and aqueous mixtures containing water-miscible solvents such as dioxan, pyridine, tetrahydrofuran, or an excess of the nitro alkane itself serve as suitable solvents in which to effect our reaction for the production of beta-hydroxyalkyl ethers of oximes. Even when the alkali metal salts of the nitro alkane are prepared separately, and then contacted with the ethylene oxide, it is desirable to use a similar solvent in order to assist in regulating the heat of the reaction.

A better understanding of the nature of our invention can be had by reference to the following examples which illustrate our invention. We do not intend, however, to be limited to the procedures, amounts and conditions set forth in the examples, but we intend for the equivalents and variations obvious to those skilled in the art to be included within the scope of this specification and the attached claims.

*Example I*

2-nitropropane, 45 g. (0.5 mole), was added over a period of one-half hour to a cooled solution of lithium ethoxide formed by reacting lithium metal, 3.45 g. (0.5 mole), with absolute ethanol (300 ml.) in a 500 ml., 3-necked flask equipped with a stirrer, dropping funnel and reflux condenser protected with a sodium hydroxide tube. The dropping funnel was replaced with a gas inlet tube extending to the bottom of the flask, and ethylene oxide, 50 g. (1.1 mole), was introduced over a period of three hours while maintaining the temperature at 50–60° C. The mixture was stirred for an additional hour, cooled, neutralized with acetic acid, and the major portion of the solvent removed by distillation at reduced pressure. The residue was taken up in a mixture of ether, (200 ml.) and water (100 ml.) and the ether layer was separated. The aqueous solution was extracted 5 times with ether (25 ml. portions). The combined ether solutions were dried and distilled, 2-Hydroxyethyl ether of acetoxime, B.P. 54° C.(2–4 mm.), $n_D^{20}$ 1.4488, 20 g. (27% theory) was isolated.

*Example II*

One mole of ethylene oxide was added to one mole of lithium 2-propane nitronate in aqueous media. The temperature and reaction conditions were maintained as indicated in Example I and the resulting product was recovered similarly. An 8% yield of 2-hydroxyethyl ether of acetoxime was obtained.

Example III

In this experiment, ethylene oxide, 2-nitropropane and lithium hydroxide were reacted as described in Example I using one mole of ethylene oxide, one mole of 2-nitropropane and 0.5 mole of lithium hydroxide. A 4% yield of 2-hydroxyethyl ether of acetoxime was obtained.

Example IV

Ethylene oxide, 50 g. (1.1 mole), was reacted with lithium ethane nitroanate, 40 g. (0.5 mole), in ethanol (300 ml.) at 50–60° C. for four hours. 2-hydroxyethyl ether of acetoxime, B.P. 38° C. (2 mm.), $n_D^{20}$ 1.4416, 3.5 g. (7% theory), was isolated.

Example V 2-nitropropane, 45 g. (0.5 mole), was added during the period of one-half hour to a cold solution of lithium ethoxide formed by reacting lithium metal, 3.5 g. (0.5 mole), with ethanol (300 ml.) in a 500 ml., 3-necked flask equipped with a stirrer, dropping funnel and reflux condenser protected with a sodium hydroxide drying tube. Propylene oxide, 56 g. (1.0 mole), was added during the period of two hours to the solution at 50–60° C. and the reaction mixture was stirred for four additional hours. The cooled solution was neutralized with acetic acid, 30 g. (0.5 mole), and the major portion of the ethanol was removed by distillation at reduced pressure. The residue was taken up in a mixture of ether (200 ml.) and water (100 ml.), and the ether layer was separated. The aqueous solution was extracted five times with ether (25 ml. portions) and the ether solutions were combined, dried, concentrated and fractionated. 2-hydroxy-1-propyl ether of acetoxime, B.P. 54° C., (2 mm.), $n_D^{20}$ 1.4420, 24 g. (37% theory) was isolated.

Example VI

One mole of propylene oxide was reacted with one mole of lithium 2-propane nitronate in aqueous medium at 50–60° C. and the product was recovered as described in Example V above. A 12% yield of 2-hydroxy-1-propyl ether of acetoxime was obtained.

Example VII 2-nitrobutane, 50 g. (0.5 mole), was added to a cooled solution of sodium ethoxide (0.4 mole) in ethanol (300 ml.). Propylene oxide, 56 g. (1.0 mole), was added during the course of three hours to the solution maintained at 50° C. and the mixture was stirred for an additional three hours. The reaction mixture was worked up as described in Example V. 2-hydroxyl-1-propyl ether of butanone oxime, B. P. 62° C. (1–2 mm.) $n_D^{20}$ 1.4446, 21 g. (29% theory) was isolated.

Example VIII

The procedure of Example VII was repeated using the same amount of reactants and the same reaction conditions except that the sodium ethoxide was replaced with lithium ethoxide. 2-hydroxy-1-propyl ether of butanone oxime, 28 g. (39% theory) was isolated.

We have found that generally primary nitroparaffins react more poorly than secondary nitroparaffins and that better yields of oxime ethers are obtained from lithium alkane nitronates than from sodium alkane nitronates under similar conditions.

The beta-hydroxyalkyl ethers of oximes produced in accordance with our new process are useful as starting materials for the production of surface active agents. Our new oxime ethers can, for example, be catalytically reduced to the corresponding N-alkylhydroxylamine ether which is then alkylated with a higher alkyl halide or sulfate, such as lauryl chloride to obtain a surface active agent such as N-ethyl-N-laurylhydroxylamine ether.

Now having described our invention, what we claim is:

1. In a process for the production of beta-hydroxyalkyl ethers of oximes having the structure

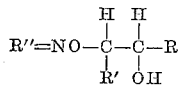

where R is selected from the group consisting of hydrogen, alkyl and aryl; R′ is selected from the group consisting of hydrogen and alkyl; and R″ is lower alkyl, the steps which consist essentially of reacting an olefin oxide selected from the group consisting of ethylene oxide, propylene oxide, butylene oxide and styrene oxide, with an alkali metal salt of a nitro lower alkane selected from the group consisting of primary nitrolowerakane and secondary nitroloweralkane at temperatures ranging from 0 to 100° C. and recovering the beta-hydroxyalkyl ethers of oximes thereby produced.

2. The process of claim 1 wherein the olefin oxide is reacted with the alkali metal salt of the nitroalkane at temperatures ranging from 50 to 80° C.

3. The process of claim 2 wherein the alkali metal salt of the nitroalkane is the alkali metal salt of 2-nitropropane.

4. The process of claim 3 wherein the olefin oxide is ethylene oxide and the alkali metal salt is a lithium salt.

5. The process claim 1 wherein the alkali metal salt is a lithium salt.

6. The process of claim 1 wherein the lower alkyl is selected from the group consisting of ethyl, propyl and butyl.

7. The process of claim 6 wherein the alkali metal salt is a lithium salt.

8. The process of claim 7 wherein the olefin oxide is ethylene oxide, the lithium salt is the lithium salt of 2-nitropropane, and the temperatures range from 50 to 80° C.

9. The process of claim 1 wherein the olefin oxide and the alkali metal salt of the nitroalkane are reacted in mole ratios of 2 moles of the former to 1 mole of the latter.

10. The process of claim 1 where the alkali metal salt of the nitroalkane is the lithium salt of nitroethane and the olefin oxide is ethylene oxide.

11. The process of claim 1 wherein the alkali metal salt of the nitro alkane is the lithium salt of nitrobutane and the olefin oxide is propylene oxide.

12. The process of claim 1 wherein the olefin oxide is ethylene oxide and the alkali metal salt is a lithium salt.

13. The process of claim 1 wherein the olefin oxide is propylene oxide and the alkali metal salt is a lithium salt.

References Cited in the file of this patent

UNITED STATES PATENTS 2,791,611     Donaruma _____ May 7, 1957

FOREIGN PATENTS 877,303     Germany _____ May 21, 1953

OTHER REFERENCES

Cretcher et al.: Jour. Amer. Chem. Soc., volume 46 (1924), pages 1503–04 (2 pages).

Fieser et al.: "Organic Chemistry" (3rd edition, 1956), page 136 (1 page), published by Reinhold Pub. Corp., New York.

Astle et al.: J. Org. Chem., volume 25, pages 507–511 (1960).